US011862855B2

(12) United States Patent
Chen et al.

(10) Patent No.: US 11,862,855 B2

(45) **Date of Patent: *Jan. 2, 2024**

(54) ANTENNA MODULE AND SEMICONDUCTOR DEVICE PACKAGE

(71) Applicant: Advanced Semiconductor Engineering, Inc., Kaohsiung (TW)

(72) Inventors: Jenchun Chen, Taoyuan (TW); Ya-Wen Liao, Taoyuan (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/071,593

(22) Filed: Nov. 29, 2022

(65) Prior Publication Data

US 2023/0086019 A1 Mar. 23, 2023

Related U.S. Application Data

(63) Continuation of application No. 17/225,045, filed on Apr. 7, 2021, now Pat. No. 11,515,645.

(51) Int. Cl.

*H01Q 19/09* (2006.01)
*H01Q 3/24* (2006.01)
*H01Q 1/42* (2006.01)
*H01Q 1/22* (2006.01)

(52) U.S. Cl.

CPC ........... *H01Q 19/09* (2013.01); *H01Q 1/2283* (2013.01); *H01Q 1/422* (2013.01); *H01Q 3/247* (2013.01)

(58) Field of Classification Search

CPC ........ H01Q 1/2283; H01Q 1/422; H01Q 1/40; H01Q 3/247; H01Q 5/40; H01Q 19/09; H01Q 19/062; H01Q 21/08; H01L 23/66; H01L 2223/6667

See application file for complete search history.

(56) References Cited

U.S. PATENT DOCUMENTS

| | | | | |
|---|---|---|---|---|
| 11,228,105 B2 * | 1/2022 | Yun | ........................ | H01Q 21/28 |
| 11,515,645 B2 * | 11/2022 | Chen | .................... | H01Q 1/2283 |
| 2019/0051989 A1 * | 2/2019 | Kim | ..................... | H01Q 19/062 |

FOREIGN PATENT DOCUMENTS

CN 102299408 A 12/2011

OTHER PUBLICATIONS

Non-Final Office Action for U.S. Appl. No. 17/225,045, dated Mar. 31, 2022, 8 pages.

Notice of Allowance for U.S. Appl. No. 17/225,045, dated Jul. 28, 2022, 5 pages.

* cited by examiner

*Primary Examiner* — Robert Karacsony

(74) *Attorney, Agent, or Firm* — FOLEY & LARDNER LLP

(57) ABSTRACT

The present disclosure provides an antenna module including a substrate, a first antenna disposed on the substrate and a second antenna disposed on the substrate and spaced apart from the first antenna. The first antenna is configured to have a first operating frequency and the second antenna is configured to have a second operating frequency different from the first operating frequency. The antenna module further includes an element configured to focus an electromagnetic wave transmitted or received by the first antenna and the second antenna. A semiconductor device package is also disclosed.

11 Claims, 8 Drawing Sheets

ANTENNA MODULE AND SEMICONDUCTOR DEVICE PACKAGE

CROSS-REFERENCE TO RELATED APPLICATION

This application is a continuation of U.S. patent application Ser. No. 17/225,045 filed Apr. 7, 2021, now issued as U.S. Pat. No. 11,515,645, the contents of which is incorporated herein by reference in its entirety.

BACKGROUND

1. Technical Field

The present disclosure relates to an antenna module and a semiconductor device package having the antenna module.

2. Description of the Related Art

Wireless communication systems may require multiple-band antennas for transmitting and receiving radio frequency ("RF") at different frequency bands to support, e.g., higher data rates, increased functionality and more users. Therefore, it is desirable for an antenna to have multiple-band performance.

SUMMARY OF THE INVENTION

In some embodiments, an antenna module includes a substrate, a first antenna disposed on the substrate and a second antenna disposed on the substrate and spaced apart from the first antenna. The first antenna is configured to have a first operating frequency and the second antenna is configured to have a second operating frequency different from the first operating frequency. The antenna module further includes an element configured to focus an electromagnetic wave transmitted or received by the first antenna and the second antenna.

In some embodiments, a semiconductor package device includes an interconnection structure and an antenna module including a plurality of antenna patterns and an element disposed on the antenna patterns. The element is configured to focus an electromagnetic wave transmitted or received by the antenna patterns. The semiconductor package device also includes an electronic component disposed on the interconnection structure and electrically connected to the antenna module.

BRIEF DESCRIPTION OF THE DRAWINGS

Aspects of some embodiments of the present disclosure are best understood from the following detailed description when read with the accompanying figures. It is noted that various structures may not be drawn to scale, and dimensions of the various structures may be arbitrarily increased or reduced for clarity of discussion.

DETAILED DESCRIPTION

Figure 1A:
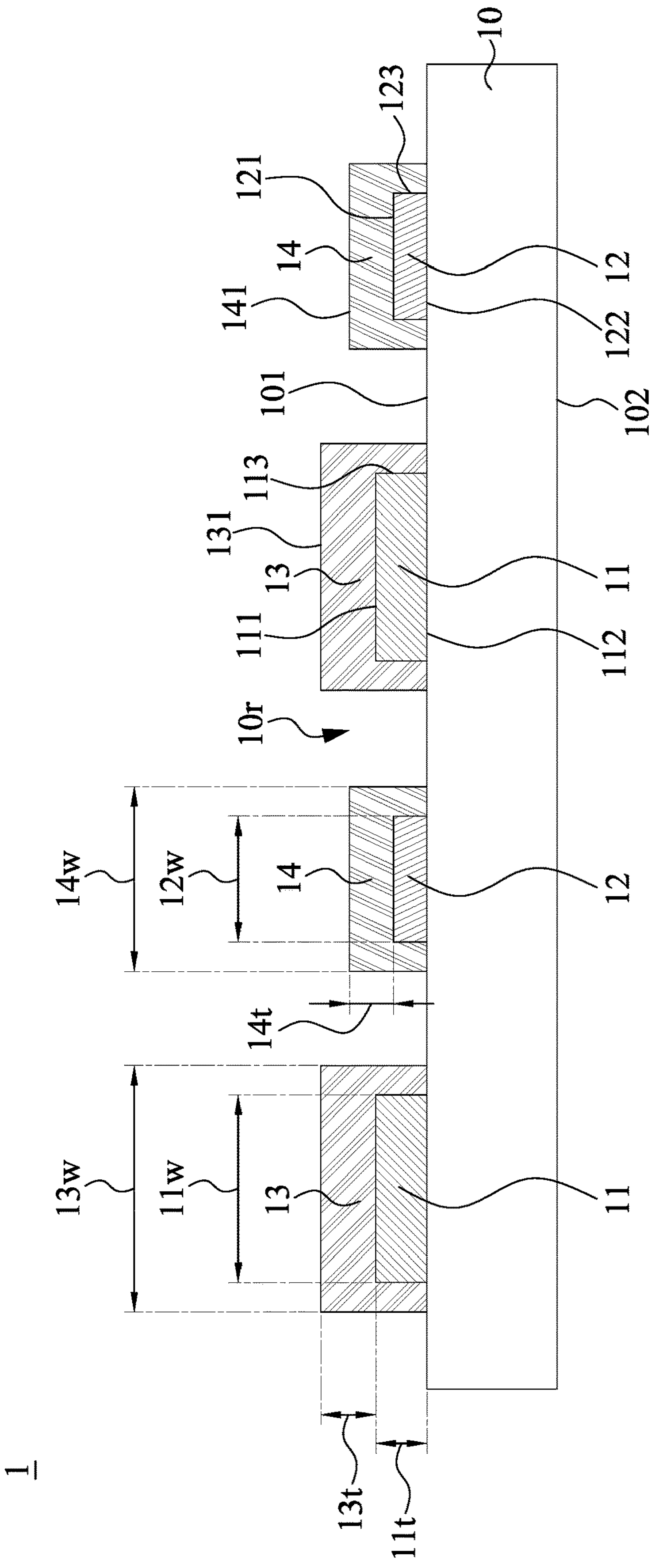
FIG. 1A illustrates a cross-sectional view of an antenna module in accordance with some embodiments of the present disclosure.

The following disclosure provides for many different embodiments, or examples, for implementing different features of the provided subject matter. Specific examples of components and arrangements are described below to explain certain aspects of the present disclosure. These are, of course, merely examples and are not intended to be limiting. For example, the formation of a first feature over or on a second feature in the description that follows may include embodiments in which the first and second features are formed or disposed in direct contact, and may also include embodiments in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated from by such arrangement.

The following description involves an antenna module and a semiconductor device package having the antenna module.

FIG. 1A illustrates a cross-sectional view of an antenna module 1 in accordance with some embodiments of the present disclosure. The antenna module 1 may include a substrate 10, antennas 11, 12, and dielectric layers 13, 14.

The substrate 10 has a surface 101 and a surface 102 opposite the surface 101. In some embodiments, the substrate 10 may be, for example, a printed circuit board, such as a paper-based copper foil laminate, a composite copper foil laminate, or a polymer-impregnated glass-fiber-based copper foil laminate. In some embodiments, the substrate 10 may include an interconnection structure, such as a redistribution layer (RDL), a grounding layer, and a feeding line. In some embodiments, the substrate 10 may include one or more conductive pads (not illustrated in the figures) in proximity to, adjacent to, or embedded in and exposed at the surface 102 of the substrate 10. The substrate 10 may include solder resists (or solder mask) (not illustrated in the figures)

on the surface 102 of the substrate 10 to fully expose or to expose at least a portion of the conductive pads for electrical connections. One or more electrical contacts (e.g., solder balls) may be disposed on the surface 102 of the substrate 10 and electrically connected to the conductive pads of the substrate 10.

The antennas 11 and 12 may be disposed on the surface 101 of the substrate 10. In some embodiments, each of the antennas 11 and 12 may include a patch antenna, such as a planar inverted-F antenna (PIFA) or other feasible kinds of antennas. In some embodiments, each of the antennas 11 and 12 may include a conductive material such as a metal or metal alloy. Examples of the conductive material include gold (Au), silver (Ag), aluminum (Al), copper (Cu), platinum (Pt), Palladium (Pd), other metal(s) or alloy(s), or a combination of two or more thereof.

In some embodiments, the antenna 11 and the antenna 12 may have different frequencies (or operating frequencies) or bandwidths (or operating bandwidths). For example, the antenna 12 (which can be referred to as a high-band antenna) may have a frequency higher than a frequency of the antenna 11 (which can be referred to as a low-band antenna). For example, the antenna 12 may be operated in a frequency of about 39 GHz. For example, the antenna 12 may be configured to transmit or receive electromagnetic waves with a frequency of about 39 GHz. For example, the antenna 11 may be operated in a frequency of about 28 GHz. For example, the antenna 11 may be configured to transmit or receive electromagnetic waves with a frequency of about 28 GHz. By incorporating the antennas having different operating frequencies, the antenna module 1 may achieve a multi-bandwidth (or multi-frequency) radiation.

In some embodiments, the antenna 11 and the antenna 12 may have different dimensions. For example, the antenna 11 has a surface 111 (or a top surface) facing away from the substrate 10, a surface 112 (or a bottom surface) opposite the surface 111, and a surface 113 (or lateral surface) extending between the surface 111 and the surface 112. In some embodiments, the surface 113 may be perpendicular to the surface 111 and/or the surface 112. In some embodiments, the surface 113 may angled at an acute or an obtuse angle to the surface 111. In some embodiments, the surface 113 may angled at an acute or an obtuse angle to the surface 112. The antenna 11 may have a thickness 11*t* measured between the surface 111 and the surface 112 and a width 11*w* measured between two surfaces 113 from a side view as shown in FIG. 1A. Similarly, the antenna 12 may have a thickness 12*t* measured between the top surface 121 and the bottom surface 122 of the antenna 12. The antenna 12 may have a width 12*w* measured between two lateral surfaces 123 from a side view as shown in FIG. 1A. In some embodiments, the thickness 11*t* may be greater than the thickness 12*t*. In some embodiments, the thickness 12*t* may be smaller than the thickness 12*t*. In some embodiments, the width 11*w* may be greater than the width 12*w*. In some embodiments, the width 12*w* may be smaller than the width 11*w*.

In some embodiments, the antennas 11 and 12 may define an antenna array. For example, the antennas 11 and 12 may be arranged in an array. For example, they may be arranged alternately or staggered with each other. For example, a high-band antenna and a low-band antenna may be arranged alternately or staggered with each other. For example, the antenna 11 may be disposed in intervals between two of the antennas 12. For example, the antenna 12 may be disposed in intervals between two of the antennas 11. For example, the antenna 11 and the antenna 12 may be spaced apart. For example, the antenna 11 and the antenna 12 may be physically disconnected with each other. In some embodiments, a part of the surface 101 of the substrate 10 may be exposed from a recess 10*r* between the antenna 11 and the antenna 12.

In some embodiments, the antennas 11 and 12 may be arranged randomly or irregularly. The patterns or sequences of the antennas may be different from the above descriptions, and the illustrations and the patterns or sequences of the antennas may be not limited thereto. In some embodiments, antennas of more than two different frequencies or bandwidths may be incorporated in the antenna module 1.

The dielectric layer 13 and the dielectric layer 14 may be element configured to focus an electromagnetic wave transmitted or received by the antenna 11 and the antenna 12.

The dielectric layer 13 may be disposed on the surface 101 of the substrate 10 and cover the antenna 11. For example, the dielectric layer 13 may be in contact with (such as in direct contact with) the surface 111 of the antenna 11. For example, the dielectric layer 13 may be in contact with (such as in direct contact with) the surface 113 of the antenna 11. For example, the dielectric layer 13 may be in contact with (such as in direct contact with) the surface 101 of the substrate 10. In some embodiments, the antenna 11 may be surrounded by the dielectric layer 13.

The dielectric layer 14 may be disposed on the surface 101 of the substrate 10 and cover the antenna 12. For example, the dielectric layer 14 may be in contact with (such as in direct contact with) the surface 121 of the antenna 12. For example, the dielectric layer 14 may be in contact with (such as in direct contact with) the surface 123 of the antenna 12. For example, the dielectric layer 14 may be in contact with (such as in direct contact with) the surface 101 of the substrate 10. In some embodiments, the antenna 12 may be surrounded by the dielectric layer 14.

In some embodiments, the dielectric layer 13 and the dielectric layer 14 may be arranged alternately or staggered with each other. In some embodiments, the dielectric layer 13 and the dielectric layer 14 may be spaced apart by the recess 10*r*.

In some embodiments, each of the dielectric layers 13 and 14 may include pre-impregnated composite fibers (e.g., pre-preg), Borophosphosilicate Glass (BPSG), silicon oxide, silicon nitride, silicon oxynitride, Undoped Silicate Glass (USG), any combination of two or more thereof, or the like. In some embodiments, each of the dielectric layers 13 and 14 may include a dielectric ceramic such as $Al_2O_3$, $Mg_2SiO_4$, $MgAl_2O_4$, $CoAl_2O_4$, or other feasible dielectric ceramics that have a standard Q-value. In some embodiments, the dielectric layer 13 and the dielectric layer 14 may have the same material. In some embodiments, the dielectric layer 13 and the dielectric layer 14 may have different materials.

In some embodiments, the dielectric layer 13 and the dielectric layer 14 may have different dielectric constants (Dk). For example, the dielectric layer 13 (which can be referred to as a low-Dk dielectric layer) may include a material having a Dk between about 17 and about 19. For example, the dielectric layer 14 (which can be referred to as a high-Dk dielectric layer) may include a material having a Dk between about 37 and about 40.

In some embodiments, the dielectric layer 13 and the dielectric layer 14 may have different dimensions. For example, the portion of the dielectric layer 13 that is over the surface 111 of the antenna 11 may have a thickness 13*t*, which is measured between the topmost point (such as a surface 131 thereof) of the dielectric layer 13 and the surface 111 of the antenna 11. The dielectric layer 13 may have a width 13$w$ measured between two lateral surfaces of the dielectric layer 13 from a side view as shown in FIG. 1A. Similarly, the portion of the dielectric layer 14 that is over the surface 121 of the antenna 12 may have a thickness 14$t$, which is measured between the topmost point (such as a surface 141 thereof) of the dielectric layer 14 and the surface 121 of the antenna 12. The dielectric layer 14 may have a width 14$w$ measured between two lateral surfaces of the dielectric layer 14 from a side view as shown in FIG. 1A. In some embodiments, the thickness 13$t$ may be greater than the thickness 14$t$. In some embodiments, the thickness 14$t$ may be smaller than the thickness 13$t$. In some embodiments, the width 13$w$ may be greater than the width 14$w$. In some embodiments, the width 14$w$ may be smaller than the width 13$w$.

In some embodiments, since the thickness 11$t$ of the antenna 11 is different from the thickness 12$t$ of the antenna 12, the dielectric layer 13 and the dielectric layer 14 are at different elevations with respect to the substrate 10. In some embodiments, the dielectric layer 13 may have the surface 131 facing away from the substrate 10 and the dielectric layer 14 may have the surface 141 facing away from the substrate 10. The surface 131 and the surface 141 may be at different elevations with respect to the substrate 10. For example, the surface 131 may be higher or farther than the surface 141 with respect to the substrate 10. For example, the total amount of the thickness 11$t$ and the thickness 13$t$ may be different from the total amount of the thickness 12$t$ and the thickness 14$t$.

In some embodiment, antennas of different frequencies or bandwidths may be covered by the same dielectric layer (e.g., same material and/or dimension). Since the electrical characteristics (i.e., permittivity ($\varepsilon$) and permeability ($\mu$)) of the electromagnetic waves transmitted or received by the antennas are different, the transmission losses of the electromagnetic waves propagating through the dielectric layer are different (i.e., according to the Friis transmission equation), and the same dielectric layer may not be able to meet the performance requirements of the antennas.

In some embodiments as shown in FIG. 1A, dielectric layers 13 and 14 (which may have different dimensions and/or different materials) are disposed on the antennas 11 and 12 (which may have different frequencies) separately. Thus, it is possible to optimize or improve the performance of both of the antennas 11 and 12 by proper adjustment of the electrical characteristics of the electromagnetic waves transmitted or received.

For example, the electrical characteristics of the electromagnetic waves may be adjusted by separately altering the dimensions, the compositions, the particle sizes, and/or the sintering temperatures of the dielectric layers 13 and 14.

Figure 1B:
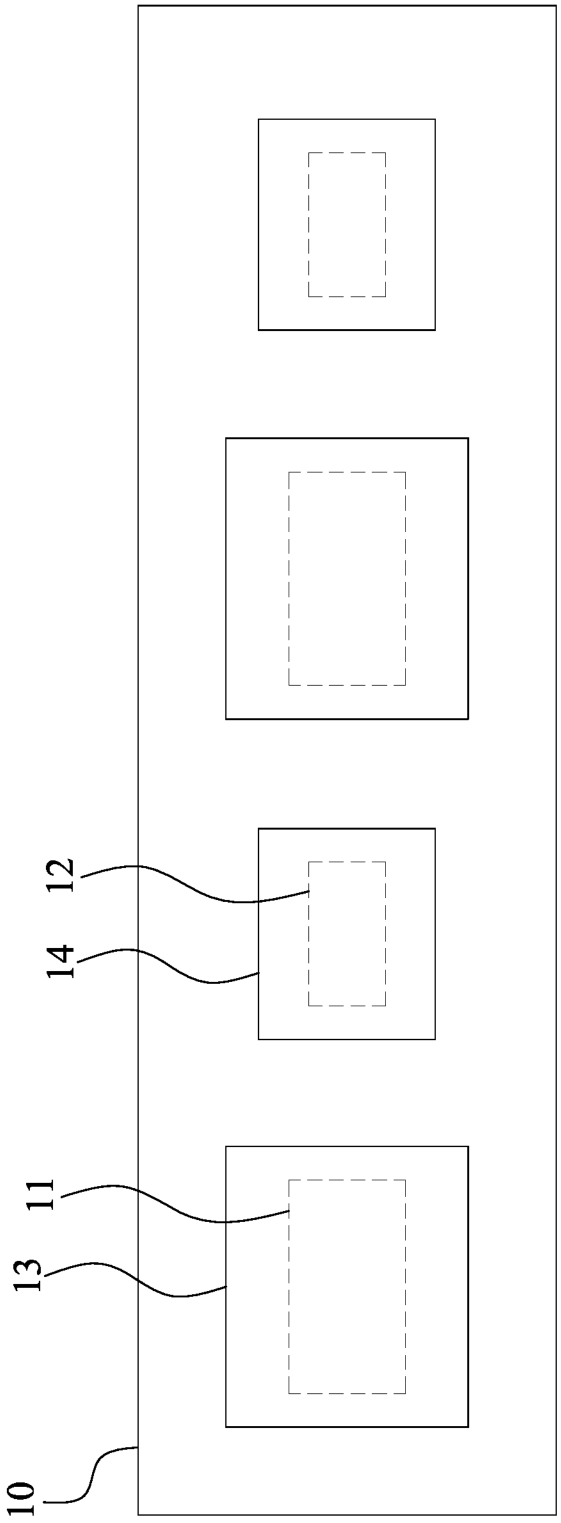
FIG. 1B illustrates a top view of an antenna module in accordance with some embodiments of the present disclosure.

In some embodiments, the electromagnetic wave transmitted or received by the antenna 11 and the antenna 12 may separately propagate and resonate in the dielectric layer 13 and the dielectric layer 14. In some embodiments, the dielectric layer 13 and the dielectric layer 14 may help to separately focus the electromagnetic waves transmitted or received by the antenna 11 and the antenna 12. In some embodiments, the dielectric layer 13 and the dielectric layer 14 may help to separately compensate for phase shifts of the electromagnetic waves transmitted or received by the antenna 11 and the antenna 12. In some embodiments, the dielectric layer 13 and the dielectric layer 14 may help to separately increase the gain of the antenna 11 and the antenna 12. In some embodiments as shown in the top view of FIG. 1B, the antenna 11 may be covered by the dielectric layer 13 and the antenna 12 may be covered by the dielectric layer 14. For example, a vertical projection of the antenna 11 on the substrate 10 may be overlapped with a vertical projection of the dielectric layer 13 on the substrate 10. For example, a vertical projection of the antenna 12 on the substrate 10 may be overlapped with a vertical projection of the dielectric layer 14 on the substrate 10. For example, a vertical projection of the antenna 11 on the substrate 10 may be within a vertical projection of the dielectric layer 13 on the substrate 10. For example, a vertical projection of the antenna 12 on the substrate 10 may be within a vertical projection of the dielectric layer 14 on the substrate 10. For example, a vertical projection of the antenna 11 on the substrate 10 may be greater than a vertical projection of the dielectric layer 13 on the substrate 10. For example, a vertical projection of the antenna 12 on the substrate 10 may be greater than a vertical projection of the dielectric layer 14 on the substrate 10.

In some embodiments, a vertical projection of the antenna 11 on the substrate 10 and a vertical projection of the dielectric layer 13 on the substrate 10 may be substantially the same. A vertical projection of the antenna 12 on the substrate 10 and a vertical projection of the dielectric layer 14 on the substrate 10 may be substantially the same.

Figure 1C:
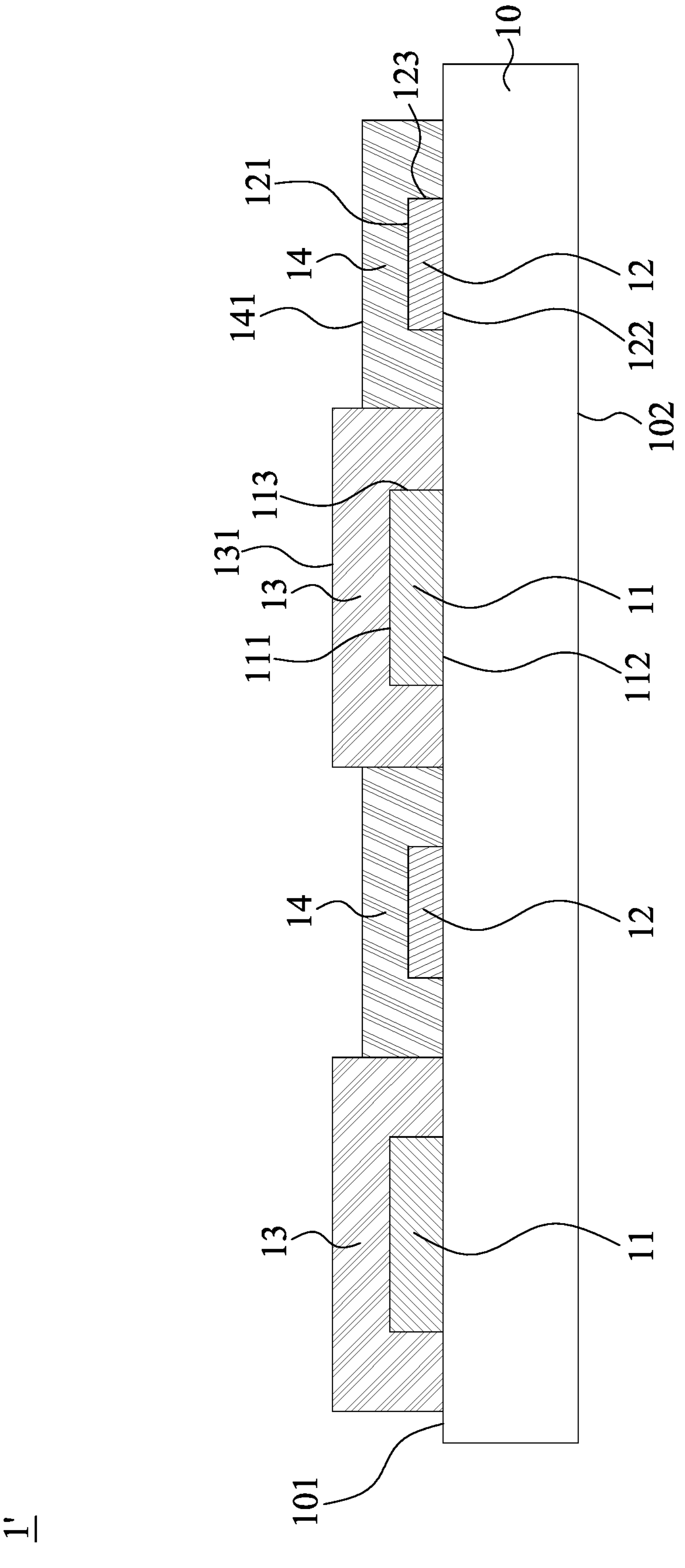
FIG. 1C illustrates a cross-sectional view of an antenna module in accordance with some embodiments of the present disclosure.

FIG. 1C illustrates a cross-sectional view of an antenna module 1' in accordance with some embodiments of the present disclosure. The antenna module 1' is similar to the antenna module 1 in FIG. 1A except that the dielectric layer 13 and the dielectric layer 14 are in contact with each other. For example, the surface 101 of the substrate 10 is not exposed between the antenna 11 and the antenna 12. For example, the surface 101 of the substrate 10 is not exposed between the dielectric layer 13 and the dielectric layer 14. In some embodiments, the surface 131 and the surface 141 may define a stepped structure. In some embodiments, the surface 131 and the surface 141 may be not coplanar. However, in some embodiments, the surface 131 and the surface 141 may be coplanar (as shown in FIG. 2B).

In some embodiments, the electromagnetic wave transmitted or received by the antenna 11 (such as a low-band antenna) may propagate through the dielectric layer 13 (such as a low-Dk dielectric layer) and partially or entirely reflect from the interface between the dielectric layer 14 (such as a high-Dk dielectric layer) and the dielectric layer 13. In some embodiments, the electromagnetic waves transmitted or received by the antenna 12 (such as a high-band antenna) may propagate through the dielectric layer 14 and partially or entirely be reflected by the interface between the dielectric layer 14 and the dielectric layer 13. In some embodiments, the reflection of the electromagnetic waves may help to increase the gain of the antenna 11 and the antenna 12.

Figure 1D:
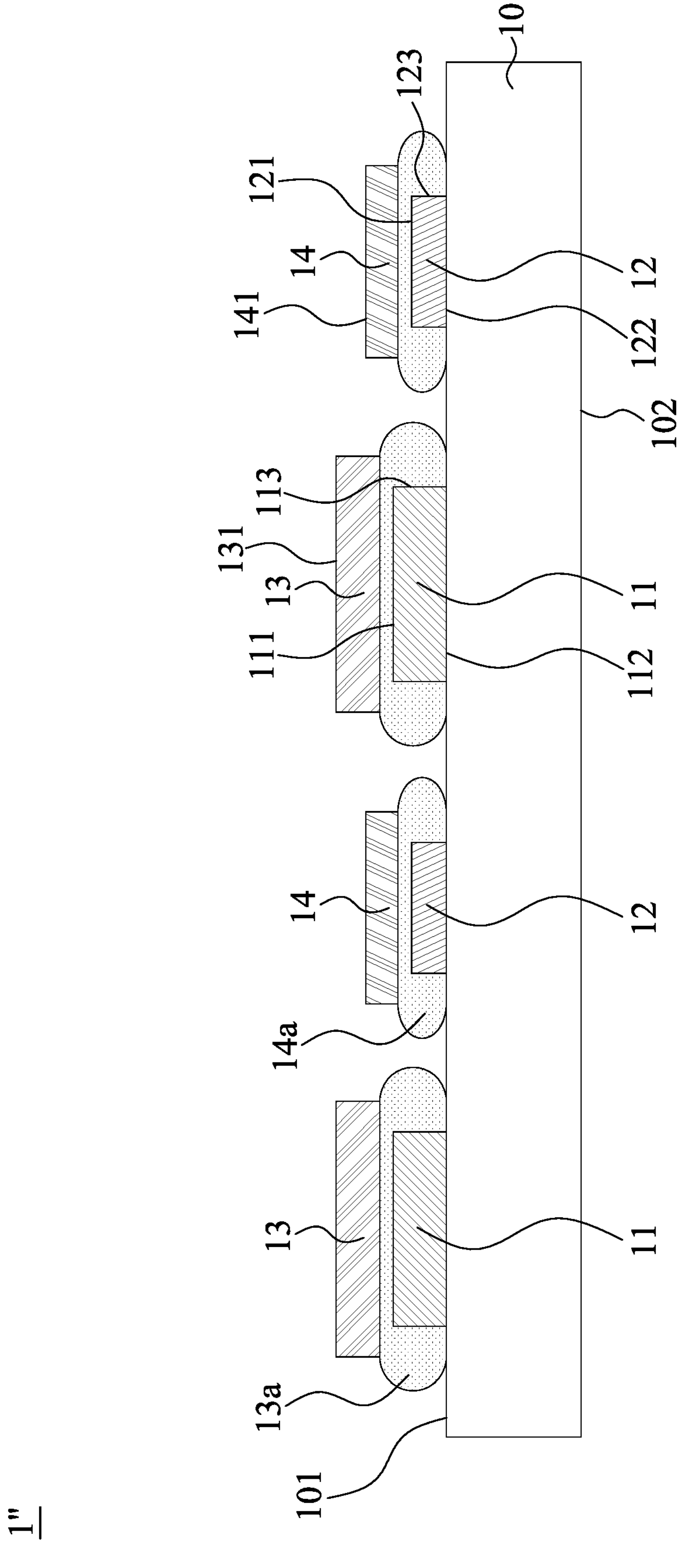
FIG. 1D illustrates a cross-sectional view of an antenna module in accordance with some embodiments of the present disclosure.

FIG. 1D illustrates a cross-sectional view of an antenna module 1" in accordance with some embodiments of the present disclosure. The antenna module 1" is similar to the antenna module 1 in FIG. 1A except that the dielectric layer 13 is attached to the antenna 11 through an adhesive layer 13$a$ and the dielectric layer 14 is attached to the antenna 12 through an adhesive layer 14$a$.

In some embodiments, the adhesive layer 13$a$ may cover the antenna 11. For example, the adhesive layer 13$a$ may be in contact with (such as in direct contact with) the top surface of the antenna 11. For example, adhesive layer 13$a$ may be in contact with (such as in direct contact with) the lateral surface of the antenna 11. For example, adhesive layer 13$a$ may be in contact with (such as in direct contact with) the surface 101 of the substrate 10. In some embodiments, the antenna 11 may be surrounded by the adhesive layer 13$a$. The adhesive layer 14$a$ may cover the antenna 12.

For example, the adhesive layer 14*a* may be in contact with (such as in direct contact with) the top surface of the antenna 12. For example, the adhesive layer 14*a* may be in contact with (such as in direct contact with) the lateral surface of the antenna 12. For example, the adhesive layer 14*a* may be in contact with (such as in direct contact with) the surface 101 of the substrate 10. In some embodiments, the antenna 12 may be surrounded by the adhesive layer 14*a*.

In some embodiments, the adhesive layer 13*a* and the adhesive layer 14*a* may be alternately or staggerly arranged with each other. In some embodiments, the adhesive layer 13*a* and the adhesive layer 14*a* may be spaced apart. In some embodiments, a part of the adhesive layer 13*a* and a part of the adhesive layer 14*a* may be connected with each other. For example, the adhesive layer 13*a* may be in contact with (such as in direct contact with) the adhesive layer 14*a*.

In some embodiments, each of the adhesive layer 13*a* and the adhesive layer 14*a* may have a material as listed above for the dielectric layer 13 and the dielectric layer 14. In some embodiments, the adhesive layer 13*a* may include a material having a Dk substantially equal to the Dk of the dielectric layer 13. For example, the adhesive layer 13*a* may include a material having a Dk between about 17 and about 19. In some embodiments, the adhesive layer 14*a* may include a material having a Dk substantially equal to the Dk of the dielectric layer 14. For example, the adhesive layer 14*a* may include a material having a Dk between about 37 and about 40.

In some embodiments, the adhesive layer 13*a* and the adhesive layer 14*a* may help to secure the dielectric layer 13 and the dielectric layer 14. The size or area of the adhesive layer 13*a* and the adhesive layer 14*a* may be enough to hold the dielectric layer 13 and the dielectric layer 14 while not affecting the propagation of the electromagnetic waves. In some embodiments, since the dielectric layer 13 and the dielectric layer 14 do not have to surround the antenna 11 and the antenna 12, the device dimensions and the cost of the antenna module 1" can be reduced.

Figure 2A:
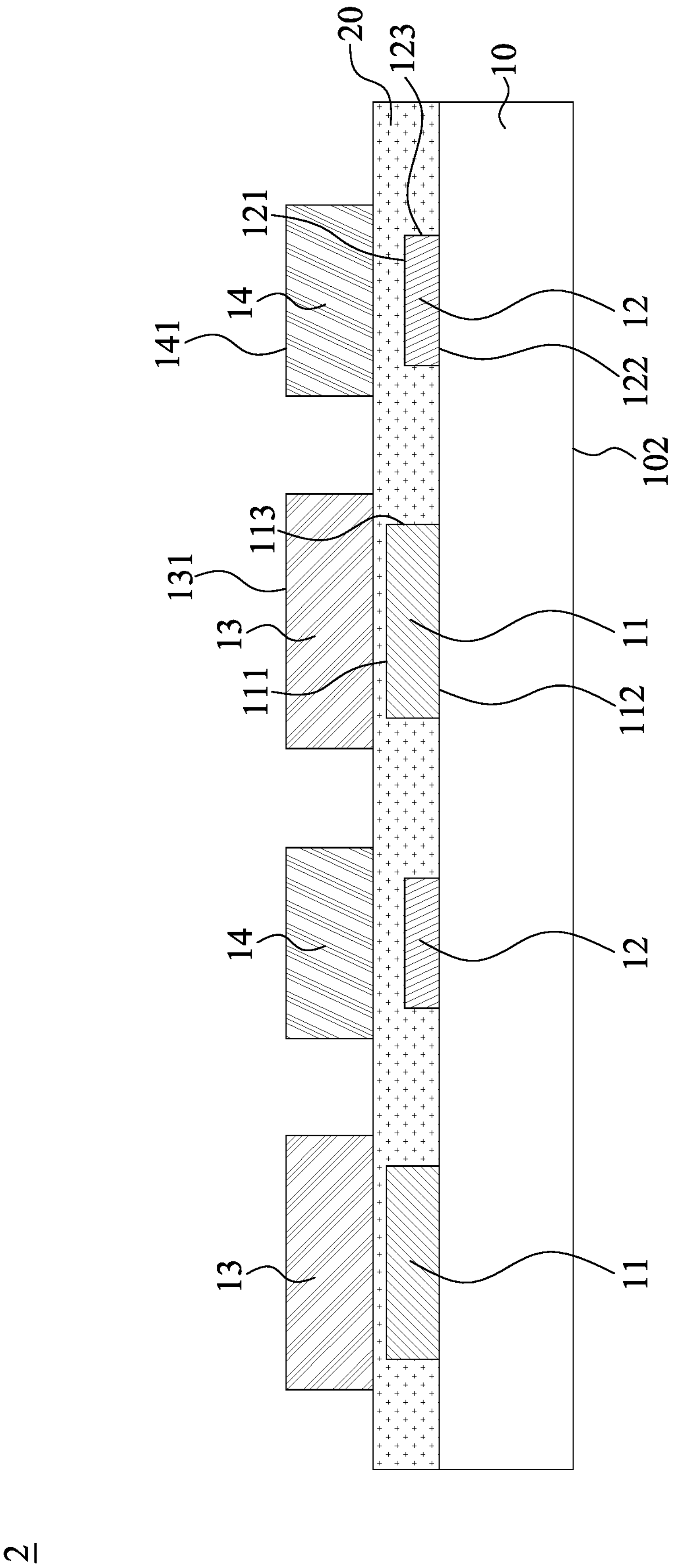
FIG. 2A illustrates a cross-sectional view of an antenna module in accordance with some embodiments of the present disclosure.
Figure 2B:
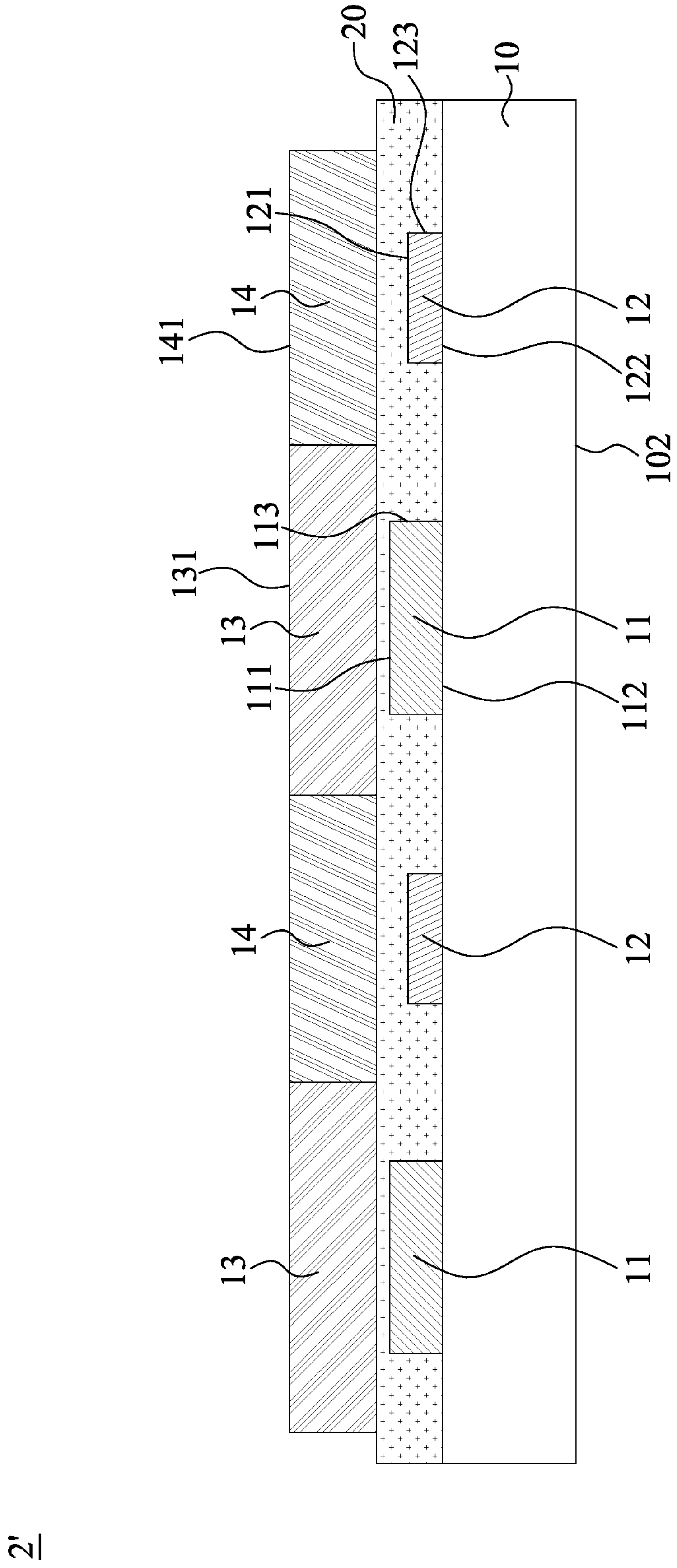
FIG. 2B illustrates a cross-sectional view of an antenna module in accordance with some embodiments of the present disclosure.

FIG. 2A illustrates a cross-sectional view of an antenna module 2 in accordance with some embodiments of the present disclosure. The antenna module 2 is similar to the antenna module 1 in FIG. 1A except that the antenna 11 and the antenna 12 are covered by a protection layer 20.

In some embodiments, the protection layer 20 may include a solder resist or solder mask. In some embodiments, the antenna 11 and the antenna 12 may be encapsulated by the protection layer 20. For example, the thickness of the protection layer 20 may be greater than the thickness 11*t* of the antenna 11. The thickness of the protection layer 20 may be greater than the thickness 12*t* of the antenna 12. In some embodiments, the protection layer 20 may have a surface substantially coplanar with a surface of the substrate 10.

The dielectric layer 13 and the dielectric layer 14 may be disposed on the protection layer 20. The dielectric layer 13 and the dielectric layer 14 may be respectively aligned to the antenna 11 and the antenna 12. In some embodiments, a projection area of the dielectric layer 13 on the substrate 10 may overlap a projection area of the antenna 11 on the substrate 10. In some embodiments, a projection area of the dielectric layer 14 on the substrate 10 may overlap a projection area of the antenna 12 on the substrate 10. In some embodiments, the width 11*w* of the antenna 11 may be within the projection area of the dielectric layer 13 on the substrate 10 such that the antenna 11 is entirely positioned below the dielectric layer 13. In some embodiments, the width 12*w* of the antenna 12 may be within the projection area of the dielectric layer 14 on the substrate 10 such that the antenna 12 is entirely positioned below the dielectric layer 14.

The dielectric layer 13 and the dielectric layer 14 may be spaced apart. A part of the protection layer 20 may be exposed from a gap between the dielectric layer 13 and the dielectric layer 14.

In some embodiments, the protection layer 20 may help to protect the antenna 11 and the antenna 12 from oxidization or contamination during transportation. In some embodiments, since the dielectric layer 13 and the dielectric layer 14 do not have to surround the antenna 11 and the antenna 12, the device dimensions and the cost of the antenna module 1" can be reduced.

FIG. 2B illustrates a cross-sectional view of an antenna module 2' in accordance with some embodiments of the present disclosure. The antenna module 2' is similar to the antenna module 2 in FIG. 2A except the dielectric layer 13 and the dielectric layer 14 are in contact with each other. For example, the protection layer 20 is not exposed between the dielectric layer 13 and the dielectric layer 14.

In some embodiments, the surface 131 and the surface 141 may be coplanar. However, in some embodiments, the surface 131 and the surface 141 may define a stepped structure. In some embodiments, the surface 131 and the surface 141 may be not coplanar (as shown in FIG. 1C).

In some embodiments, the electromagnetic waves transmitted or received by the antenna 11 (such as a low-band antenna) may propagate through the protection layer 20, the dielectric layer 13 (such as a low-Dk dielectric layer), and partially or entirely be reflected by the interface between the dielectric layer 14 (such as a high-Dk dielectric layer) and the dielectric layer 13. In some embodiments, the electromagnetic waves transmitted or received by the antenna 12 (such as a high-band antenna) may propagate through the protection layer 20, the dielectric layer 14, and partially or entirely be reflected by the interface between the dielectric layer 14 and the dielectric layer 13. In some embodiments, the reflection of the electromagnetic waves may help to increase the gain of the antenna 11 and the antenna 12.

Figure 3A:
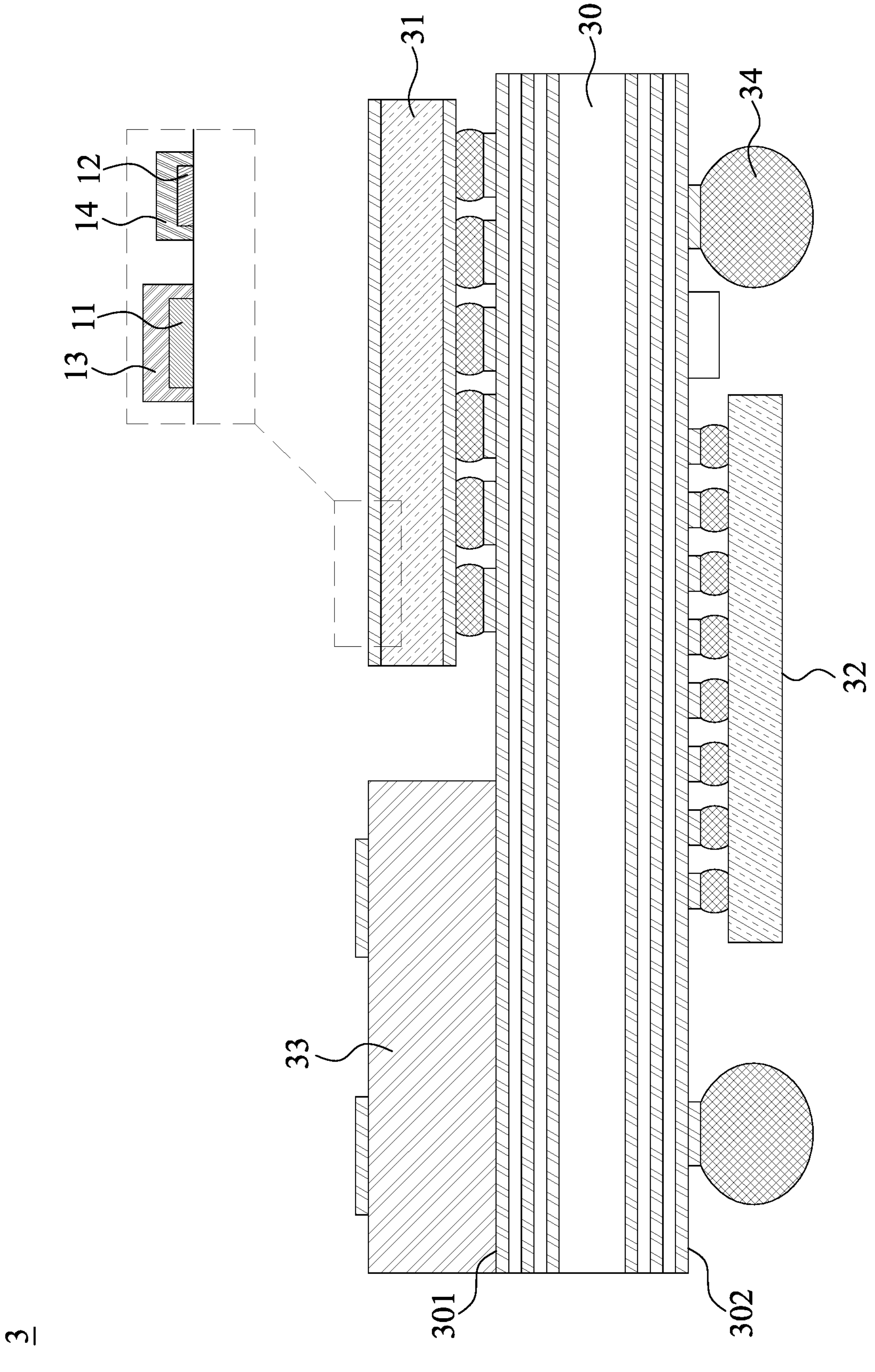
FIG. 3A illustrates a cross-sectional view of a semiconductor device package in accordance with some embodiments of the present disclosure.

FIG. 3A illustrates a cross-sectional view of a semiconductor device package 3 in accordance with some embodiments of the present disclosure. The semiconductor device package 3 includes a carrier 30, an antenna module 31, electronic components 32, 33, and electrical contact 34.

The carrier 30 has a surface 301 and a surface 302 opposite the surface 301. The carrier 30 may be, for example, a printed circuit board, such as a paper-based copper foil laminate, a composite copper foil laminate, or a polymer-impregnated glass-fiber-based copper foil laminate. In some embodiments, the carrier 30 may include an interconnection structure, such as a RDL, a grounding layer, and a feeding line.

The antenna module 31 may be disposed on the surface 301 of the carrier 30. The antenna module 31 may be one of the antenna module 1, the antenna module 1', the antenna module 1", the antenna module 2, and the antenna module 2'. For example, as shown in the enlarged view in FIG. 3A, the antenna module 31 may have antennas 11 and 12, and dielectric layers 13 and 14.

The electronic component 32 may be disposed on the surface 302 of the carrier 30. The electronic component 33 may be disposed on the surface 301 of the carrier 30. The electronic component 33 and the antenna module 31 may be disposed side-by-side. The electronic component 33 and the antenna module 31 may be located at different areas of the carrier 30.

Each of the electronic components 32 and 33 may be a chip or a die including a semiconductor substrate, one or more integrated circuit devices and one or more overlying interconnection structures therein. The integrated circuit devices may include active devices such as transistors and/or passive devices such as resistors, capacitors, inductors, or a combination thereof. In some embodiments, each of the electronic components 32 and 33 may be a transmitter, a receiver, or a transceiver. In some embodiments, each of the electronic components 32 and 33 may include an RF IC. Although there are two electronic components in FIG. 3A, the number of the electronic components is not limited thereto. In some embodiments, there may be any number of electronic components depending on design requirements.

Each of the electronic components 32 and 33 may be electrically connected to one or more of other electrical components and to the carrier 30 and the electrical connections may be attained by way of flip-chip or wire-bond techniques.

Each of the electronic components 32 and 33 may be electrically connected to the antenna module 31. In some embodiments, the signal transmission path between each of the electronic components 32 and 33 and the antenna module 31 may be attained by a feeding line in the carrier 30. In some embodiments, the feeding line may include, but not limited to, a metal pillar, a bonding wire or stacked vias. In some embodiments, the feeding line may include Au, Ag, Al, Cu, or an alloy thereof.

The electrical contact 34 (e.g. a solder ball) is disposed on the surface 302 of the carrier 30 and can provide electrical connections between the semiconductor package device 3 and external components (e.g. external circuits or circuit boards). In some embodiments, the electrical contact 34 includes a controlled collapse chip connection (C4) bump, a ball grid array (BGA) or a land grid array (LGA). In some embodiments, the antenna module 31 and the electrical contact 34 may be disposed on the same side of the carrier 30. In some embodiments, the electrical contact 34 may be omitted.

Figure 3B:
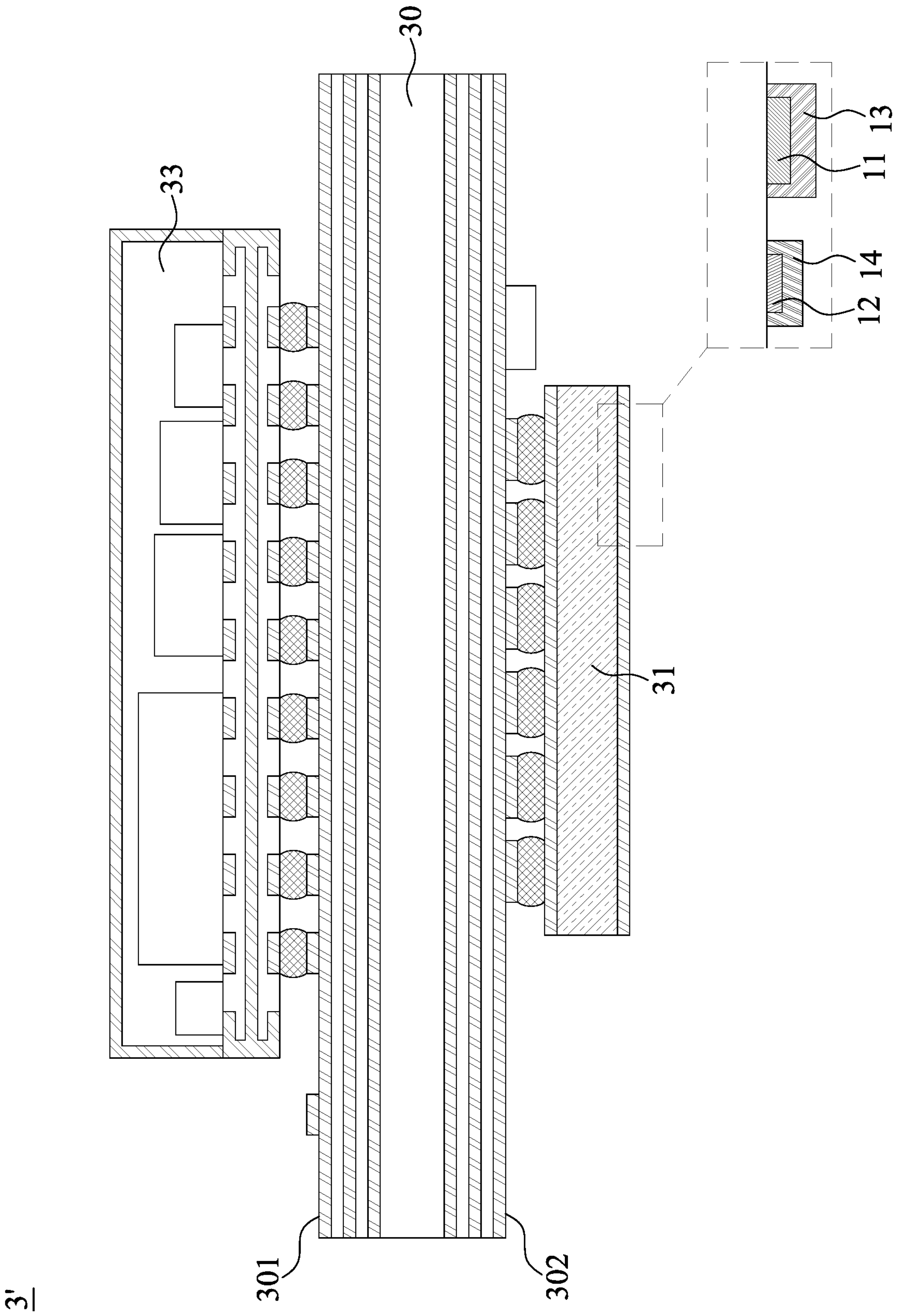
FIG. 3B illustrates a cross-sectional view of a semiconductor device package in accordance with some embodiments of the present disclosure.

FIG. 3B illustrates a cross-sectional view of a semiconductor device package 3' in accordance with some embodiments of the present disclosure. The semiconductor device package 3 is similar to the semiconductor device package 3 in FIG. 3A except that the antenna module 31 and the electronic component 33 are disposed on opposite surface of the carrier 30 and that the electrical contact 34 as shown in FIG. 3A is omitted.

As used herein, the singular terms "a," "an," and "the" may include a plurality of referents unless the context clearly dictates otherwise.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately $10^4$ S/m, such as at least $10^5$ S/m or at least $10^6$ S/m. The electrical conductivity of a material can sometimes vary with temperature. Unless otherwise specified, the electrical conductivity of a material is measured at room temperature.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same or equal if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" parallel can refer to a range of angular variation relative to 0° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°. For example, "substantially" perpendicular can refer to a range of angular variation relative to 90° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An antenna module, comprising:

a first antenna;

a second antenna disposed adjacent to the first antenna;

a first dielectric layer having a first Dk and configured to focus a first electromagnetic wave transmitted or received by the first antenna; and a second dielectric layer having a second Dk different from the first Dk and configured to focus a second electromagnetic wave transmitted or received by the second antenna, wherein the first dielectric layer and the second dielectric layer include different elevations.

2. The antenna module of claim 1, further comprising:

a substrate, wherein the second dielectric layer is disposed over the substrate, and wherein a lateral surface of the second dielectric layer is not aligned with a lateral surface of the substrate.

3. The antenna module of claim 2, further comprising:

an electronic component disposed under the substrate and electrically connected with the first antenna.

4. The antenna module of claim 1, wherein a width of the first antenna is greater than a width of the second antenna from a cross-sectional view.

5. An antenna module, comprising:

a first antenna;

a second antenna disposed adjacent to the first antenna;

a first dielectric layer disposed over the first antenna, the first dielectric layer having a first Dk; and a second dielectric layer disposed over the second antenna, the second dielectric layer having a second Dk different from the first Dk, wherein the first dielectric layer is spaced apart from the second dielectric layer, and wherein the first antenna comprises a first antenna array and the second antenna comprises a second antenna array.

6. An antenna module, comprising:

a first antenna;

a second antenna disposed adjacent to the first antenna;

a first dielectric layer disposed over the first antenna, the first dielectric layer having a first Dk; and a second dielectric layer disposed over the second antenna, the second dielectric layer having a second Dk different from the first Dk, wherein the first dielectric layer is spaced apart from the second dielectric layer, and wherein the first antenna is configured to have a first operating frequency and the second antenna is configured to have a second operating frequency greater than the first operating frequency.

7. The antenna module of claim 6, wherein the second Dk of the second dielectric layer is greater than the first Dk of the first dielectric layer.

8. The antenna module of claim 5, wherein the first dielectric layer has a first thickness and the second dielectric layer has a second thickness different from the first thickness.

9. An antenna module, comprising:

a first antenna;

a second antenna disposed adjacent to the first antenna;

a first dielectric layer disposed over the first antenna, the first dielectric layer having a first Dk;

a second dielectric layer disposed over the second antenna, the second dielectric layer having a second Dk different from the first Dk;

a first adhesive layer disposed between the first antenna and the first dielectric layer; and a second adhesive layer disposed between the second antenna and the second dielectric layer, wherein the first adhesive layer is spaced apart from the second adhesive layer, and wherein the first dielectric layer is spaced apart from the second dielectric layer.

10. The antenna module of claim 5, wherein the first dielectric layer covers a lateral surface of the first antenna.

11. An antenna module, comprising:

a first antenna;

a second antenna disposed adjacent to the first antenna;

a first dielectric layer disposed over the first antenna, the first dielectric layer having a first Dk;

a second dielectric layer disposed over the second antenna, the second dielectric layer having a second Dk different from the first Dk; and a protection layer covering the first antenna and the second antenna, wherein the first dielectric layer is spaced apart from the second dielectric layer, and wherein the protection layer is disposed between the first antenna and the first dielectric layer and disposed between the second antenna and the second dielectric layer.

* * * * *